United States Patent [19]

Eiswerth et al.

[11] 4,364,160
[45] Dec. 21, 1982

[54] METHOD OF FABRICATING A HOLLOW ARTICLE

[75] Inventors: James E. Eiswerth; Louis Lievestro, both of West Chester; Richard C. Haubert; Harvey M. Maclin, both of Cincinnati, all of Ohio

[73] Assignee: General Electric Company, Cincinnati, Ohio

[21] Appl. No.: 203,176

[22] Filed: Nov. 3, 1980

[51] Int. Cl.$^3$ .................. B23P 15/04; B23P 13/00
[52] U.S. Cl. .................. 29/156.8 H; 29/156.8 B; 29/416; 416/96 R; 228/193; 228/194
[58] Field of Search ............... 29/156.8 B, 156.8 H, 29/416; 416/96 R, 97 R, 212 A, 212 R, 232; 228/171, 193, 194

[56] References Cited

U.S. PATENT DOCUMENTS

| | | | |
|---|---|---|---|
| 2,380,628 | 7/1945 | Zempel | 29/416 |
| 2,787,049 | 4/1957 | Stalker | 29/156.8 H |
| 3,298,085 | 1/1967 | Bleicher | 29/416 |
| 3,466,725 | 9/1969 | Kock | 29/416 |
| 3,628,226 | 12/1971 | Nelson | 29/156.8 H |
| 3,815,199 | 6/1974 | Malavazos | 29/416 |
| 4,128,929 | 12/1978 | DeMusis | 51/217 R |
| 4,214,355 | 7/1980 | Zelahy | 29/156.8 B |

FOREIGN PATENT DOCUMENTS

| | | | |
|---|---|---|---|
| 200185 | 1/1955 | Australia | 416/97 |
| 751127 | 6/1956 | United Kingdom | 416/97 |
| 985772 | 3/1965 | United Kingdom | 416/96 |
| 1261237 | 1/1972 | United Kingdom | 29/156.8 R |
| 1571441 | 7/1980 | United Kingdom | 29/156.8 |

OTHER PUBLICATIONS

Aviation Week and Space Technology/Dec. 3, 1979 Article Entitled "Computer-Controlled Production Gains" Jerry Mayfield.

*Primary Examiner*—Daniel C. Crane
*Attorney, Agent, or Firm*—Francis L. Conte; Derek P. Lawrence

[57] ABSTRACT

A method of fabricating a hollow article, such as a rotor blade, comprising the steps of forming a solid piece of material and establishing a reference datum thereon, cutting the piece into two parts and establishing aligning means for adjacent surfaces of the two parts, separating the two parts and forming at least one cavity in one of the adjacent surfaces, aligning the adjacent surfaces using the aligning means, fastening the two parts together, and forming the external surfaces of the article using the reference datum as a positional reference.

16 Claims, 8 Drawing Figures

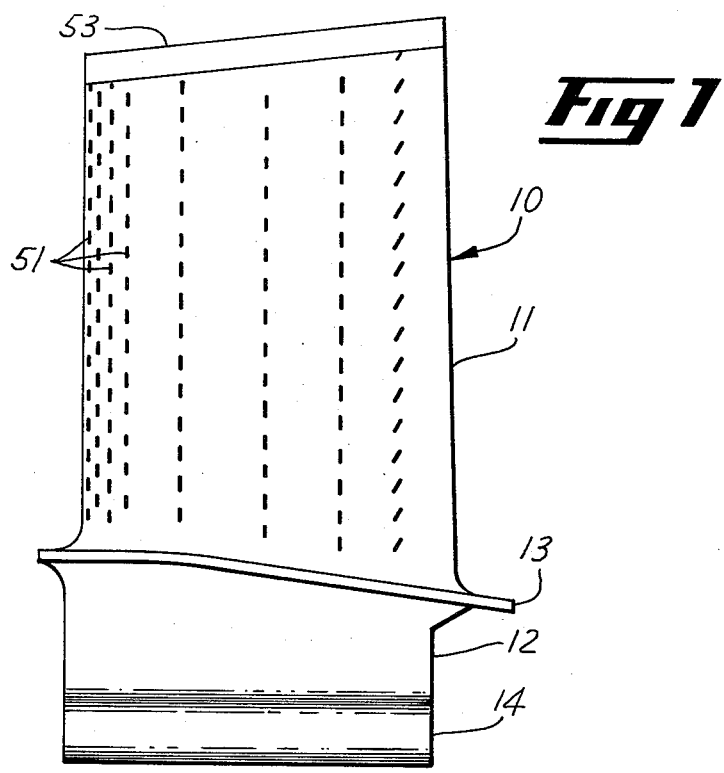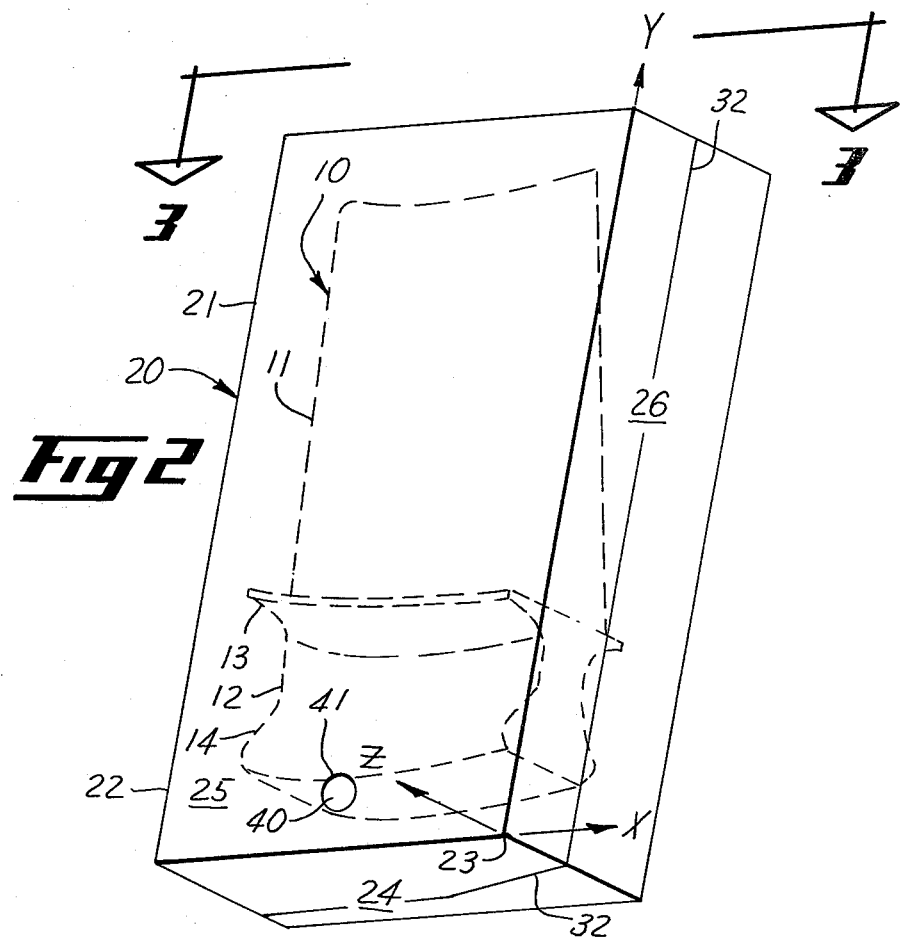

METHOD OF FABRICATING A HOLLOW ARTICLE

The invention herein described was made in the course of or under a contract, or a subcontract thereunder, with the United States Department of the Air Force.

BACKGROUND OF THE INVENTION

1. Field of the Invention

This invention relates to methods of fabrication and particularly to a new and improved method of fabricating a hollow article.

2. Description of the Prior Art

Certain articles, such as rotor blades in a gas turbine engine, are often fabricated to be hollow, that is, to have internal cavities, in order to reduce weight and promote cooling. One method of fabricating such hollow rotor blades is by casting, using a ceramic mold to form the external surface and a ceramic insert, or core, to form the internal surface. Molten metal is poured between the mold and core and the assembly is cooled until the metal solidifies. The mold is then removed and the core dissolved by chemical means, leaving the finished blade. Although this method of fabrication has been successfully employed with many materials at various temperatures, the method has certain limitations. For example, in the fabrication of certain blades, such as eutectic blades, it has been found that during solidification of the cast metal alloy, carbides form on the surfaces of the newly formed blade as a result of a reaction between the ceramic mold, the core and the cast material. Chemical removal of the carbides can leave sharp cornered pits in the internal and external surfaces of the blade. Such pits can result in reduction in blade life. To avoid such pits, the carbides are thus removed from the surfaces of the blade mechanically. This extra step, however, increases fabrication time and cost.

Another method used for fabricating hollow blades has been by casting the blade as two separate halves, separately machining or milling cavities in the inner portions of each half, and then fastening or bonding the halves together. Although this method of fabrication has also been successfully employed, it has some drawbacks. For instance, casting the blade halves separately can result in a mismatch between the halves when they are bonded, requiring additional time and expense for correction. Additionally, the bond line, or interface between the adjacent surfaces of the two halves, normally extends from the leading edge to the trailing edge of the completed blade. The leading and trailing edges of the blade, however, are locations of high stress and high temperature. At such high stress and temperature locations, it is preferable for reasons of structural integrity not to have a bond line.

Further, the bond line often follows the cord line of the blade and is thus curved. When the process for bonding the two halves together requires exertion of pressure against the two halves, it is difficult to exert pressure substantially normal to the bond line, at which angle the pressure will be most effective. Furthermore, application of pressure against the outer surfaces of the halves is difficult since, in the case of a rotor blade, one of the surfaces is concave and the other is convex.

In view of the above-mentioned problems, it is therefore an object of the present invention to provide a method of fabricating a hollow article which reduces or eliminates the formation of carbides on the internal and external surfaces of the article.

Another object of the present invention is to provide a method of fabrication which facilitates proper match-up and fit between parts to be bonded.

Still another object of the present invention is to provide a method of fabrication which improves the structural integrity of the finished article by disposing the interface between adjacent surfaces of parts at locations of low stress.

Yet another object of the present invention is to provide a method of fabrication which improves the bonding between parts of the article by facilitating exertion of pressure on the parts substantially normal to the interface between adjacent surfaces of the parts.

SUMMARY OF THE INVENTION

The method of the present invention, in accordance with one form thereof, comprises a method of fabricating a hollow article. The method includes the steps of forming a solid piece of material, establishing at least one reference datum on the piece, cutting the piece into two parts, establishing aligning means for the adjacent surfaces of the two parts, separating the two parts and forming at least one cavity in at least one of the adjacent surfaces, aligning the adjacent surfaces using the aligning means, fastening the two parts together, and forming the external surfaces of the article using the reference datum as a positional reference.

In a particular form of the method of this invention, the path of the cut is selected for extending through areas of low stress of the article and a dowel is employed as an aligning means for the adjacent surfaces of the two parts. The forming of the internal and external surfaces of the article can be accomplished by machining. When the external surface of the article comprises an airfoil portion and a base portion, the airfoil portion is formed first, a secondary reference datum is established on the airfoil portion, and the base portion is then formed using the secondary reference datum as a positional reference.

BRIEF DESCRIPTION OF THE DRAWING

This invention will be better understood from the following description taken in conjunction with the accompanying drawing, wherein:

FIG. 1 is a side view of an article fabricated in accordance with the method of the present invention.

FIG. 2 is a side perspective view of a block of material from which the article is fabricated.

DESCRIPTION OF THE PREFERRED FORM OF THE METHOD

Figure 3:
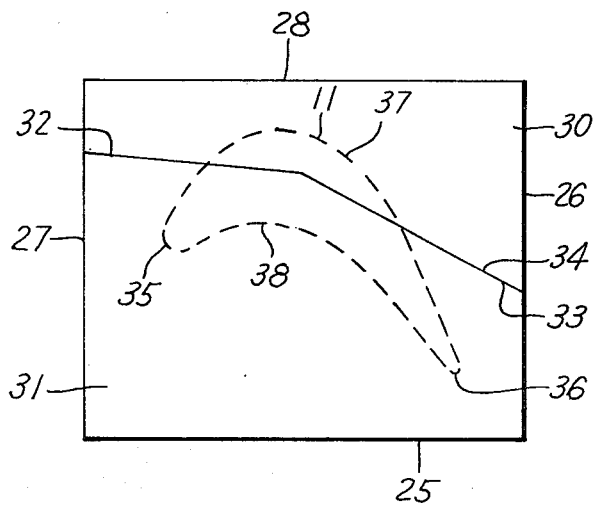
FIG. 3 is top view of the block of material taken along lines 3—3 of FIG. 2 showing the path of a cut through the block.

Turning now to a consideration of the drawing, and in particular to FIG. 1, there is shown a hollow article which has been fabricated according to the method of the present invention. By a "hollow article" is meant an article having a cavity, gap, or space in the interior thereof. The hollow article shown in FIG. 1 is a rotor blade 10 comprising an airfoil portion 11 and a base portion 12, including a platform 13 and a dovetail 14. Although the method of this invention will be described hereinafter with reference to the fabrication of such a rotor blade, it is to be understood that the method of this invention can be successfully employed to fabricate other hollow articles as well.

Referring now to FIG. 2, the first step of the method of fabrication is the forming of a solid piece of material, such as the block of material 20, which has dimensions greater than or equal to the dimensions of the article, such as the rotor blade 10 shown in dashed lines, which is to be fabricated. Although the piece of material can be of any desired shape, the generally rectangular shape of the block 20 is preferable because, as will be seen hereinafter, after the block 20 has been cut into two parts, bonding of the two parts is facilitated by the flat external surfaces which permit a more uniform exertion of pressure against the two parts and therefore along the surfaces to be bonded. The forming of the piece of material is preferably done by casting it in a mold. This is preferably the only step in the method which employs the process of casting. Since, as will be seen later, the internal and external surfaces of the article will be formed, such as by machining, from the cast piece of material, any carbides which might form on the surface of the piece of material as a result of its being cast will thus be removed as the internal and external surfaces of the article are formed.

The material of which the article will be fabricated is chosen based upon factors such as the environment to which the article will be subjected. In the case of a rotor blade for a gas turbine engine, one example of a suitable material is a cast nickel base superalloy known commercially as Rene'150, more particularly described in U.S. Pat. No. 4,169,742-Wukusick, issued Oct. 2, 1979, and assigned to the same assignee as is the present invention, the disclosure of which is incorporated herein by reference. Another example of a material which is particularly suitable for use in the fabrication of eutectic rotor blades is an aligned carbide fiber reinforced composite eutectic alloy, known commercially as NiTaC 14b, more particularly described in U.S. Pat. No. 3,904,402-Smashey, issued Sept. 9, 1975, and assigned to the same assignee as is the present invention, the disclosure of which is also incorporated herein by reference.

The block 20 includes an upper portion 21 and a lower portion 22 which generally correspond in location to the airfoil portion 11 and the base portion 12, respectively, of the rotor blade 10 which will be formed therefrom.

For increased strength along the length of the blade 10, the grain of the material comprising the block 20 can be oriented lengthwise, that is, from the upper portion to the lower portion of the block. Such grain orientation can be accomplished by directional solidification of the block 20 through any appropriate method.

The next step in the method of fabrication is the establishment of at least one reference datum and preferably a plurality of reference datums on the piece of material. The reference datums will be used later as positional references for the forming of internal cavities and external surfaces of the article and for properly aligning and fastening the two parts of the piece of material after it has been cut.

When the piece of material is a block 20, preferably at least one reference datum is established by precision grinding portions of at least three adjacent sides of the block 20 to define at least one corner. For example and as can be seen in FIG. 2, a reference datum 23 can be established at a corner defined by the lower surface 24 and two side surfaces 25 and 26 on the lower portion 22 of the block 20. The corner defines an origin of the reference datum 23 and the intersections of the three adjacent surfaces 24, 25, and 26 define axes, such as the X, Y, and Z axes of the reference datum 23. It is desirable to have a reference datum 23 at two of the corners of the block 20 such that when the block 20 is cut into two parts, each part will retain a reference datum.

Reference datums may be established at positions on the block 20 other than at the corners. However, such datums should be located on the lower portion 22 of the block 20 in order that they can be employed as positional references when the upper portion 21 of the block is formed into an airfoil portion 11 of the rotor blade 10.

Referring to FIGS. 2 and 3, the piece of material, such as the block 20, is next cut into two parts 30 and 31. The path of the cut, indicated by the solid line 32, and which is sometimes referred to as a bond line, extends longitudinally through the block 20 from the upper to the lower portions 21 and 22 of the block and axially between the surfaces 26 and 27 of the block 20 and is thus the interface between the two parts 30 and 31. The path of the cut 32 defines adjacent surfaces 33 and 34 of the two parts 30 and 31 respectively. The path of the cut 32 is selected to extend through areas of low stress and relatively low temperature in the article to be fabricated. For example, when the article is a rotor blade 10, high stress areas of the airfoil portion 11 of the rotor blade are at the leading and trailing edges 35 and 36. At and near the leading and trailing edges 35 and 36, the airfoil portion 11 is narrower and thus the stress exerted upon those sections of the airfoil and more concentrated than they are at the wider center section of the airfoil. Furthermore, the leading and trailing edges 35 and 36 tend to become hotter than does the rest of the airfoil and thus thermal stresses are greater. Therefore, it is preferable that the path of the cut 32 not extend through the leading and trailing edges 35 and 36 where such a cut could adversely affect airfoil structural integrity. Rather, as is seen in FIG. 3 in which the airfoil portion 11 is indicated in dashed lines, the path of the cut 32 of this invention extends through the wider center section of the airfoil portion 11 which is a low stress area. More specifically, the airfoil portion 11 comprises a suction side 37 and a pressure side 38, the suction side 37 being generally convex and the pressure side 38 being generally concave. The path of the cut 32 in the configuration of FIG. 3 intersects only the suction side 37 of the airfoil portion 11.

The path of the cut 32 is preferably such that the adjacent surfaces 33 and 34 defined by the path of the cut comprise one or more planar surfaces which are generally parallel to the surfaces of the block 20 against which the pressure will be exerted when the two parts 30 and 31 are fastened together. In the configuration of FIG. 3, the adjacent surfaces 33 and 34 each comprise two planar surfaces which intersect along a generally longitudinally extending axis. The resultant angle between the planar surfaces of each of the two parts 30 and 31 facilitates axial alignment of the two parts when they are subsequently fastened together since the two parts mate, or fit into each other, at the location of the angles. An advantage of having adjacent surfaces which comprise planar surfaces extending generally parallel to the side surfaces 25 and 28 rather than having adjacent surfaces which are curved, is that, when the two parts are to be fastened or bonded together utilizing pressure exerted against the side surfaces 25 and 28, the planar surfaces facilitate uniform distribution of the pressure along and normal to the adjacent surfaces, resulting in a better bond.

The cutting of the block 20 can be by any desired means. One example of such means is wire cutting by electrodischarge machining (EDM).

The next step of fabrication is the establishment of aligning means for the adjacent surfaces 33 and 34 of the two parts 30 and 31. Any desired aligning means can be employed. One example of such means is the above-described arrangement shown in FIG. 3 of the planar surfaces disposed at an angle to each other and which comprise each of the adjacent surfaces 33 and 34. The adjacent surfaces 33 and 34 thus fit together so as to align the two parts 30 and 31 axially.

Another aligning means, which is shown in FIG. 2, is a dowel 40. A hole 41, having a shape corresponding to the cross-sectional shape of the dowel 40, is drilled or otherwise formed through each of the two parts 30 and 31 of the block 20. Preferably, the hole 41 is drilled at a location such that it does not extend through that portion of the block which will be formed into the article, such as the rotor blade 10. For example, the hole 41 can be disposed in the lower portion 22 of the block 20 below the dovetail 14. The dowel 40 should fit snugly into the hole 41 such that the two parts 30 and 31 will be properly aligned. The dowel 40 can be used together with the above-described arrangement of the planar surfaces to align the two parts 30 and 31.

Figures 4, 5:
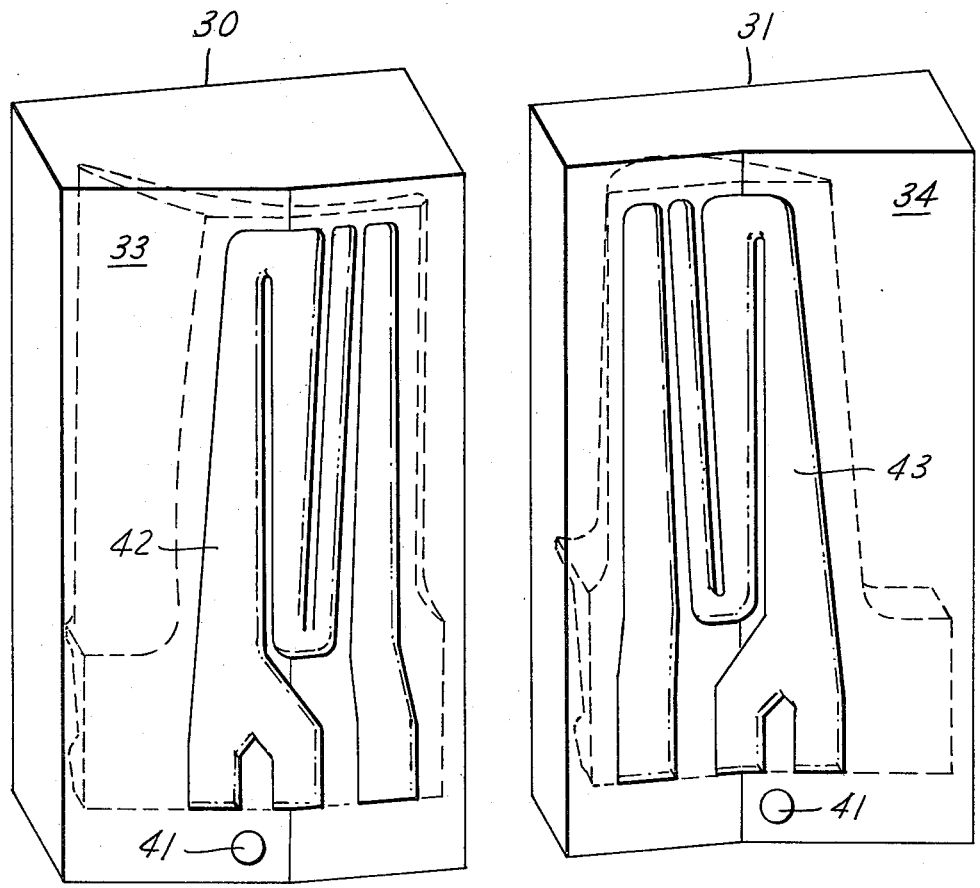
FIGS. 4 and 5 are side perspective views of the two parts of the block showing cavities formed in the surfaces thereof.

The two parts 30 and 31 of the block 20 are next separated. At least one cavity is formed in at least one of the adjacent surfaces 33 or 34 in order to define a hollow interior of the article being fabricated. FIGS. 4 and 5 show the two parts 30 and 31 after they have been separated. Cavities 42 and 43 have been formed in an appropriate manner, such as by machining, in the adjacent surfaces 33 and 34 respectively. The reference datums 23 and the holes 41 for the dowel 40 can be used as reference locations for precisely machining the cavities 42 and 43. Of course, the number and the shapes of the cavities 42 and 43, which will be the internal cavities of the rotor blade 10 when the two parts 30 and 31 are fastened together, can be varied as needed to reduce weight and improve cooling.

The adjacent surfaces 33 and 34 of the two parts 30 and 31 are then aligned by means of the aligning means, such as the dowel 40, and, if desired, by means of the reference datums 23.

The two parts 30 and 31, having been aligned, are next fastened together. The fastening can be by any appropriate means, such as by bonding. One type of bonding which can be successfully employed is known as activated diffusion bonding (ADB). In ADB, a boron film is disposed between the adjacent surfaces 33 and 34 and when heated under pressure, the boron diffuses into the adjacent surfaces causing the two parts 30 and 31 to be bonded together. As was indicated earlier, when pressure is required for fastening, such as it would be in bonding, the flat side surfaces 25 and 28 of the block 20 facilitate exertion of the pressure uniformly against the two parts 30 and 31 and along the path of the cut 32, as can be seen in FIG. 3. Likewise, the planar surfaces comprising the adjacent surfaces 33 and 34 of the two parts 30 and 31 facilitate uniform pressure distribution substantially normal to the adjacent surfaces, the normal being the most effective pressure angle for enhancing bonding.

Figure 6:
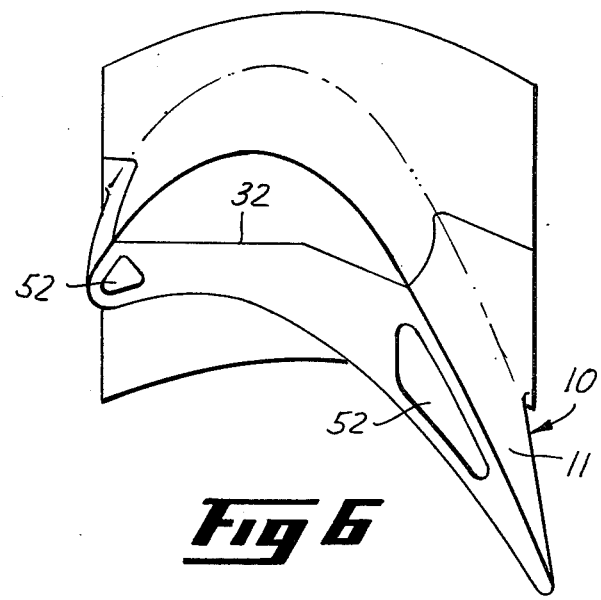
FIG. 6 is a top perspective view of the airfoil portion of the article showing the path of the cut therethrough.
Figure 7:
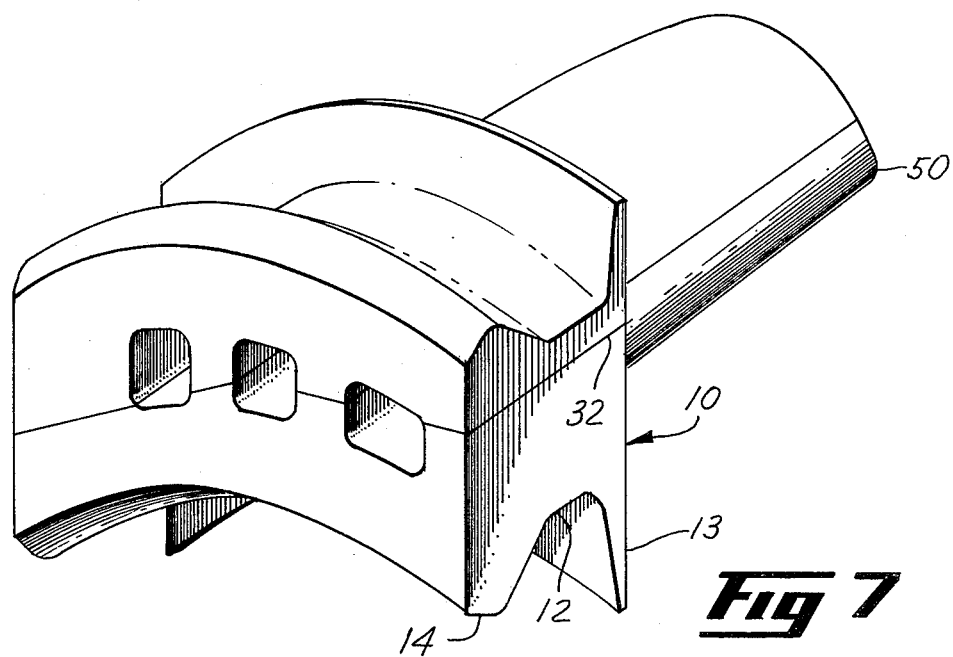
FIG. 7 is a bottom perspective view of the base portion of the article showing the path of the cut therethrough.

The external surfaces of the article are then formed in any appropriate manner, such as by machining, using the reference datums 23 as positional references. When the article is a rotor blade 10, the airfoil portion 11 can be formed first, as seen in FIG. 6. At least one secondary reference datum 50 is then established on the airfoil such as at the end of the leading or trailing edge of the airfoil portion 11. The secondary reference datum 50 is used as a positional reference for forming the external surface of the base portion 12 which, as can be seen in FIG. 7, can include a platform 13 and dovetail 14.

The article, such as the rotor blade 10, has now been fabricated. Referring to FIG. 1, cooling holes can be drilled, bored, or otherwise established as by electrodischarge machining, at various locations on the rotor blade. Larger cavities 52, shown in FIG. 6 which extend through the external surface to the interior of the article, can also be formed in an appropriate manner, such as by electrodischarge machining.

Figure 8:
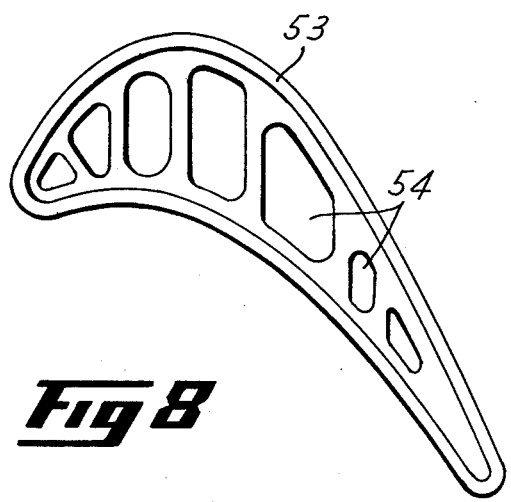
FIG. 8 is a top view of a tip cap for the article.

Finally, if desired, a tip cap 53, shown in FIG. 8, can be attached, as by bonding, to the end of the rotor blade 10, in an arrangement such as that shown in FIG. 1. Cooling holes matching the shape of the openings 54 in the tip cap 53 can be drilled, bored, electrodischarge machined, or otherwise extended from the tip cap into the cavities 42 and 43 within the rotor blade 10 to provide an exit for the cooling air therefrom.

Alternatively, the rotor blade 10 can have an integral tip cap. The internal portion of such an integral tip cap can be formed together with the cavities 42 and 43 which are formed in the adjacent surfaces 33 and 34, respectively, and the external portion of the tip cap can be formed when the external surfaces of the rotor blade 10 are formed. Appropriate cooling holes through such a tip cap can be formed in the manner indicated above.

It is to be understood that the method of this invention is not limited to the particular forms disclosed, and it is intended to cover all modifications coming within the true spirit and scope of this invention as claimed.

What is claimed is:

1. A method of fabricating a hollow article having an airfoil portion and a base portion, said airfoil portion including a convex side, a concave side, a leading edge and a trailing edge, comprising the steps of:
 (a) forming a solid piece of material having dimensions greater than or equal to the dimensions of said article and including upper and lower portions corresponding to said airfoil and base portions respectively of said article;
 (b) establishing at least one reference datum on said piece of material;
 (c) cutting said piece of material into two parts, the path of the cut extending through said piece of material from said upper portion to said lower portion and defining complementary adjacent surfaces of the two parts, each of said adjacent surfaces comprising only two planar surfaces which intersect along a generally longitudinally extending axis at an angle to each other for facilitating alignment in step (f);
 (d) establishing aligning means for said adjacent surfaces of said two parts;

(e) separating said two parts and forming at least one cavity in at least one of said adjacent surfaces for defining a hollow interior of said article;

(f) aligning said adjacent surfaces of said two parts by means of said aligning means and by abutting said complimentary adjacent surfaces of said two parts;

(g) fastening said two parts together; and (h) forming external surfaces of said upper portion of said article utilizing said reference datum as a positional reference to form said airfoil portion having said convex side, said concave side, said leading edge and said trailing edge so that said path of said cut intersects only said convex side at points spaced from said leading edge and said trailing edge.

2. The method of claim 1 wherein said solid piece of material formed in step (a) comprises a substantially rectangular block of material.

3. The method of claim 2 wherein the establishment of said reference datum in step (b) comprises the precision grinding of portions of at least three adjacent sides of said block of material to define at least one corner, said corner and the intersections of said three adjacent sides defining an origin and axes respectively of said reference datum.

4. The method of claim 1 wherein said adjacent surfaces defined by said path of the cut in step (c) on each of said two parts comprises one or more planar surfaces.

5. The method of claim 1 wherein said aligning means in step (d) comprises a dowel extending through holes in said two parts.

6. The method of claim 1 wherein the forming of at least one cavity in step (e) comprises the machining of at least one cavity.

7. The method of claim 1 wherein the fastening of said two parts in step (g) comprises bonding said two parts.

8. The method of claim 1 wherein said bonding comprises activated diffusion bonding.

9. The method of claim 1 wherein the forming of external surfaces of said article in step (h) comprises machining of said external surfaces.

10. A method of fabricating a hollow article having an airfoil portion and a base portion, said airfoil portion including a convex side, a concave side, a leading edge and a trailing edge, comprising the steps of:

(a) casting a substantially rectangular block of material having dimensions greater than or equal to the dimensions of said article and including upper and lower portions corresponding to said airfoil and base portions respectively of said article;

(b) establishing reference datums on said lower portion of said block;

(c) cutting said block into two parts, the path of the cut extending through said block from said upper portion to said lower portion and defining complementary adjacent surfaces of said two parts, each of said adjacent surfaces comprising only two planar surfaces which intersect along a generally longitudinally extending axis at an angle to each other for facilitating alignment in step (f);

(d) forming a hole in said lower portion of said block to receive a dowel for aligning said two parts;

(e) separating said two parts and machining at least one cavity in at least one of said adjacent surfaces for defining a hollow interior of said article;

(f) aligning said adjacent surfaces of said two parts by means of said dowel and by abutting said complimentary adjacent surfaces of said two parts;

(g) bonding said two parts together;

(h) machining external surfaces of said upper portion utilizing said reference datums as positional references to form said airfoil portion having said convex side, said concave side, said leading edge and said trailing edge so that said path of said cut intersects only said convex side at points spaced from said leading edge and said trailing edge;

(i) establishing at least one secondary reference datum on said airfoil portion; and (j) machining external surfaces of said lower portion utilizing said secondary reference datum as a positional reference to form said base portion.

11. The method of claim 10 wherein the casting of said block in step (a) includes orienting the grain of said block lengthwise from said upper portion to said lower portion.

12. The method of claim 10 wherein the establishment of said reference datums in step (b) comprises the precision grinding of a lower surface and three surfaces adjacent said lower surface on the lower portion of said block for defining a corner on each of said two parts, said corners and the intersections of said adjacent sides defining origins and axes respectively of said reference datums.

13. The method of claim 10 wherein said base portion of said article comprises a platform and a dovetail and the machining of external surfaces of said base portion in step (j) comprises machining external surfaces of said platform and said dovetail.

14. The method of claim 10 comprising an additional step (k) of drilling cooling holes in said airfoil portion.

15. The method of claim 16 comprising an additional step (1) of bonding a tip cap to an end of said airfoil portion.

16. The method of claim 10 wherein the cutting of said block into two parts in step (c) comprises wire cutting by electrodischarge machining said block into two parts.

* * * * *